United States Patent
Sato et al.

(10) Patent No.: US 9,459,103 B2
(45) Date of Patent: Oct. 4, 2016

(54) NON-TRANSITORY COMPUTER READABLE MEDIUM STORING PROGRAM, MOVEMENT SITUATION DETERMINING METHOD, AND MOVEMENT SITUATION DETERMINING DEVICE

(75) Inventors: Masahiro Sato, Kanagawa (JP);
Takayuki Takeuchi, Kanagawa (JP);
Kyotaro Tomoda, Kanagawa (JP);
Minoru Mitsui, Kanagawa (JP);
Tsutomu Ishii, Kanagawa (JP);
Shigehiko Sasaki, Kanagawa (JP);
Akira Ichiboshi, Kanagawa (JP);
Takao Naito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 636 days.

(21) Appl. No.: 13/541,196

(22) Filed: Jul. 3, 2012

(65) Prior Publication Data
US 2013/0253878 A1    Sep. 26, 2013

(30) Foreign Application Priority Data

Mar. 22, 2012   (JP) .................................. 2012-065775

(51) Int. Cl.
*G01P 15/00* (2006.01)
*G01C 21/12* (2006.01)

(52) U.S. Cl.
CPC .......... *G01C 21/12* (2013.01); *H04M 2250/12* (2013.01)

(58) Field of Classification Search
CPC .... G01C 22/006; G01C 21/16; G01C 21/00; A61B 5/1123; G01P 13/00; G01P 15/00; H04M 1/00
USPC .......... 702/141, 150, 104, 189, 142; 434/65
See application file for complete search history.

(56) References Cited

U.S. PATENT DOCUMENTS

| | | | | |
|---|---|---|---|---|
| 2006/0251334 A1* | 11/2006 | Oba | ...................... | A61B 5/1122 382/275 |
| 2007/0091292 A1* | 4/2007 | Cho | ...................... | G06F 1/1626 355/75 |
| 2008/0010226 A1* | 1/2008 | Brinker | ................ | G06K 9/6284 706/12 |

(Continued)

FOREIGN PATENT DOCUMENTS

JP    A-2005-286809    10/2005
JP    A-2007-088524    4/2007

(Continued)

OTHER PUBLICATIONS

Long et al., Single-Accelerometer-Based Daily Physical Activity Classification, 2009,IEEE,978-1-4244-3296-7/09, p. 6107-6110.*

(Continued)

*Primary Examiner* — John Breene
*Assistant Examiner* — Mohammad Islam
(74) *Attorney, Agent, or Firm* — Oliff PLC

(57) ABSTRACT

A non-transitory computer readable medium stores a movement situation determining program for causing a computer to function as a two-axial direction correlation value calculating portion that calculates a correlation value indicating a relationship between motions in two axial directions of a plurality of axial directions on the basis of information obtained by detecting motions of a moving target in the plurality of axial directions, and a movement situation determining portion that determines a movement situation of the moving target on the basis of the correlation value.

21 Claims, 8 Drawing Sheets

(56) References Cited

U.S. PATENT DOCUMENTS

| | | | |
|---|---|---|---|
| 2008/0288200 A1* | 11/2008 | Noble | A61B 5/1116 |
| | | | 702/96 |
| 2010/0070235 A1 | 3/2010 | Cho et al. | |
| 2010/0161271 A1* | 6/2010 | Shah | A61B 5/112 |
| | | | 702/141 |
| 2011/0163955 A1* | 7/2011 | Nasiri | A63F 13/06 |
| | | | 345/158 |
| 2011/0178759 A1* | 7/2011 | Uchida | G01C 22/006 |
| | | | 702/141 |
| 2011/0282620 A1 | 11/2011 | Sakuraoka | |
| 2012/0022780 A1* | 1/2012 | Kulik | G01C 21/28 |
| | | | 701/498 |
| 2012/0065524 A1* | 3/2012 | Morren | A61B 5/1102 |
| | | | 600/484 |
| 2012/0072166 A1* | 3/2012 | Keal | G01C 21/165 |
| | | | 702/150 |
| 2012/0150431 A1* | 6/2012 | Ooka | G01C 21/20 |
| | | | 701/425 |
| 2012/0259578 A1* | 10/2012 | Bevilacqua | G06F 1/1694 |
| | | | 702/141 |
| 2013/0029681 A1* | 1/2013 | Grokop | G01C 21/16 |
| | | | 455/456.1 |

FOREIGN PATENT DOCUMENTS

| | | |
|---|---|---|
| JP | A-2007-295510 | 11/2007 |
| JP | A-2009-238196 | 10/2009 |
| JP | 2010-056773 A | 3/2010 |
| JP | A-2010-074278 | 4/2010 |
| JP | 2011-257374 A | 12/2011 |

OTHER PUBLICATIONS

Nov. 4, 2015 Office Action issued in Japanese Patent Application No. 2012-065775.

* cited by examiner

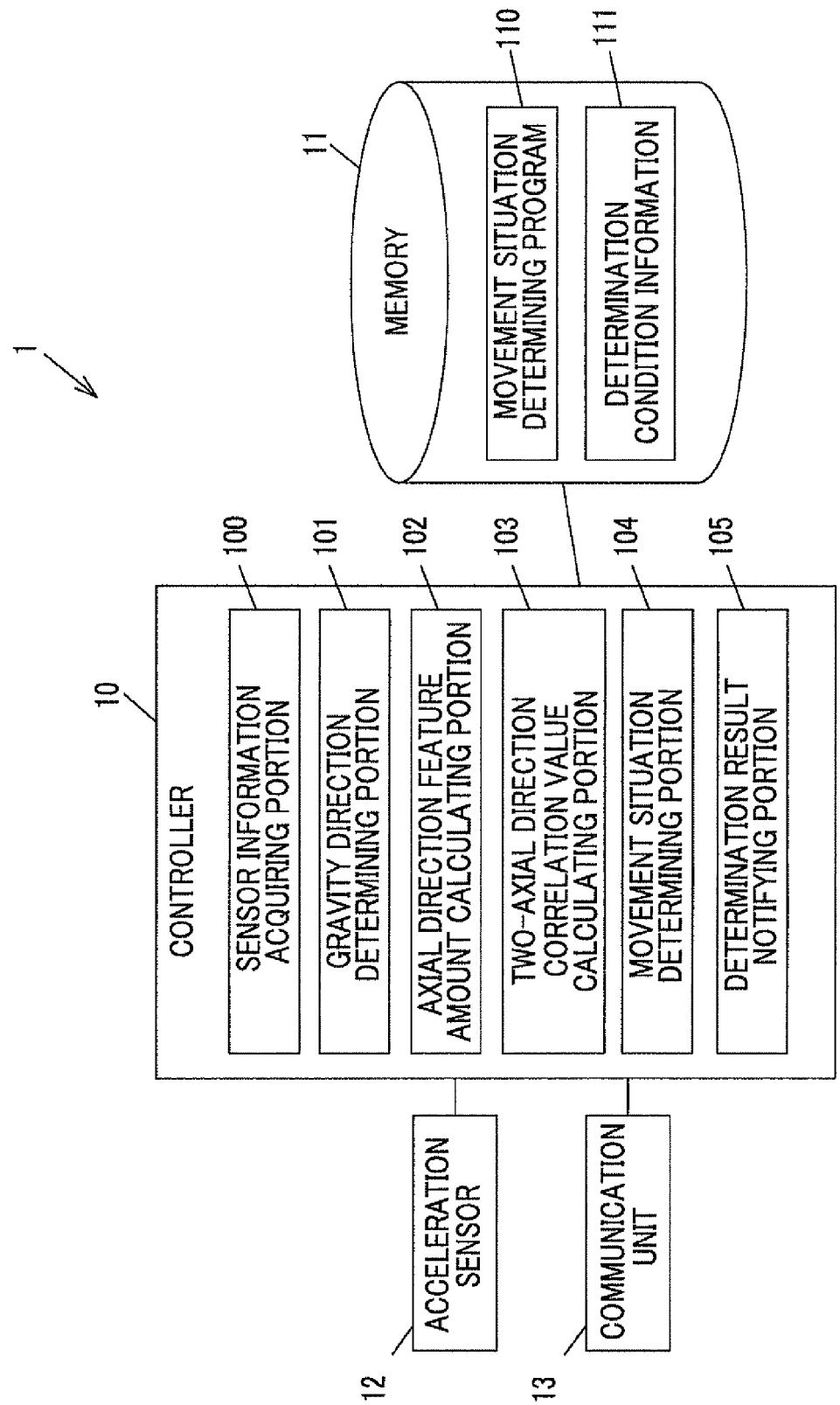

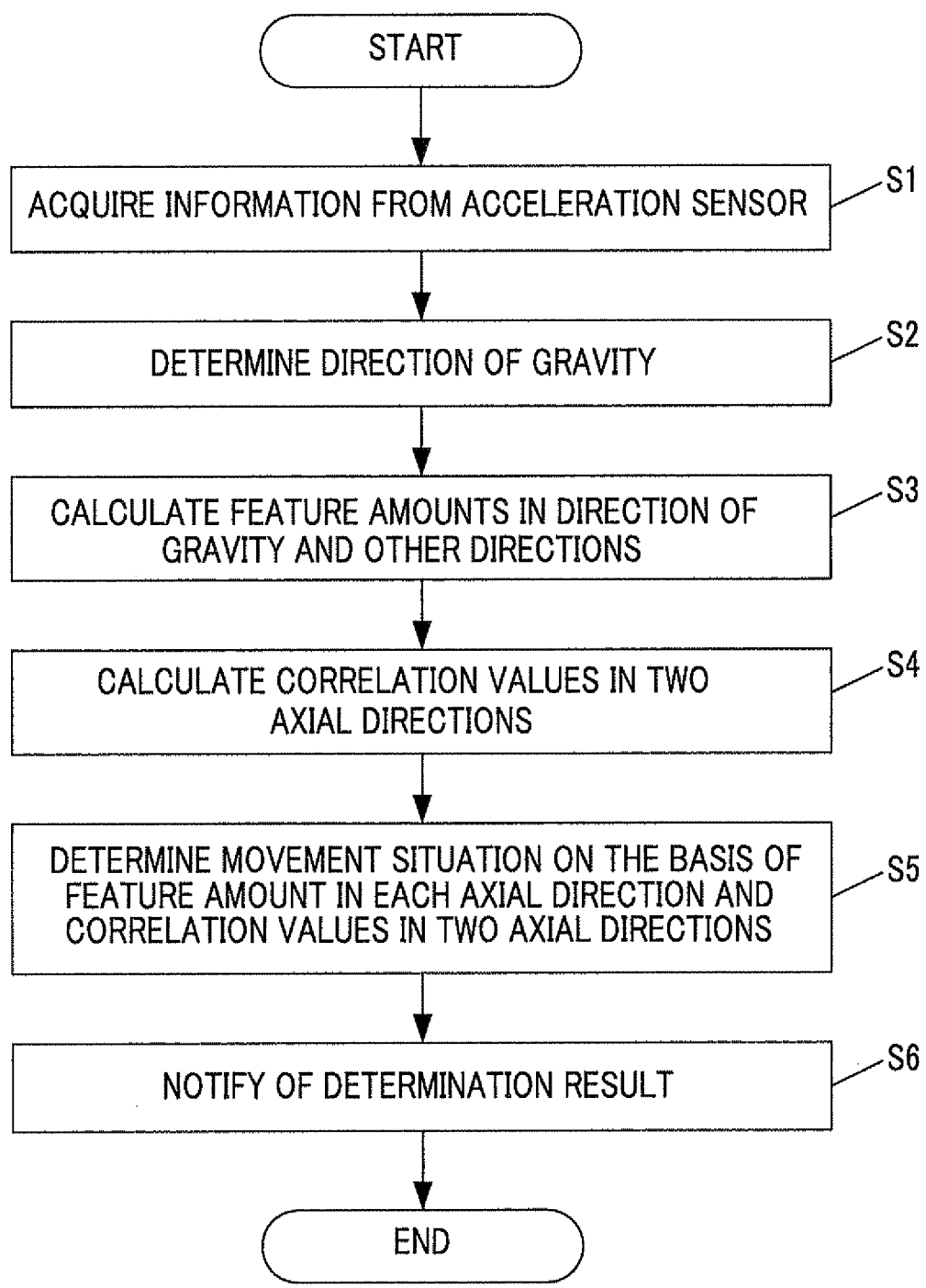

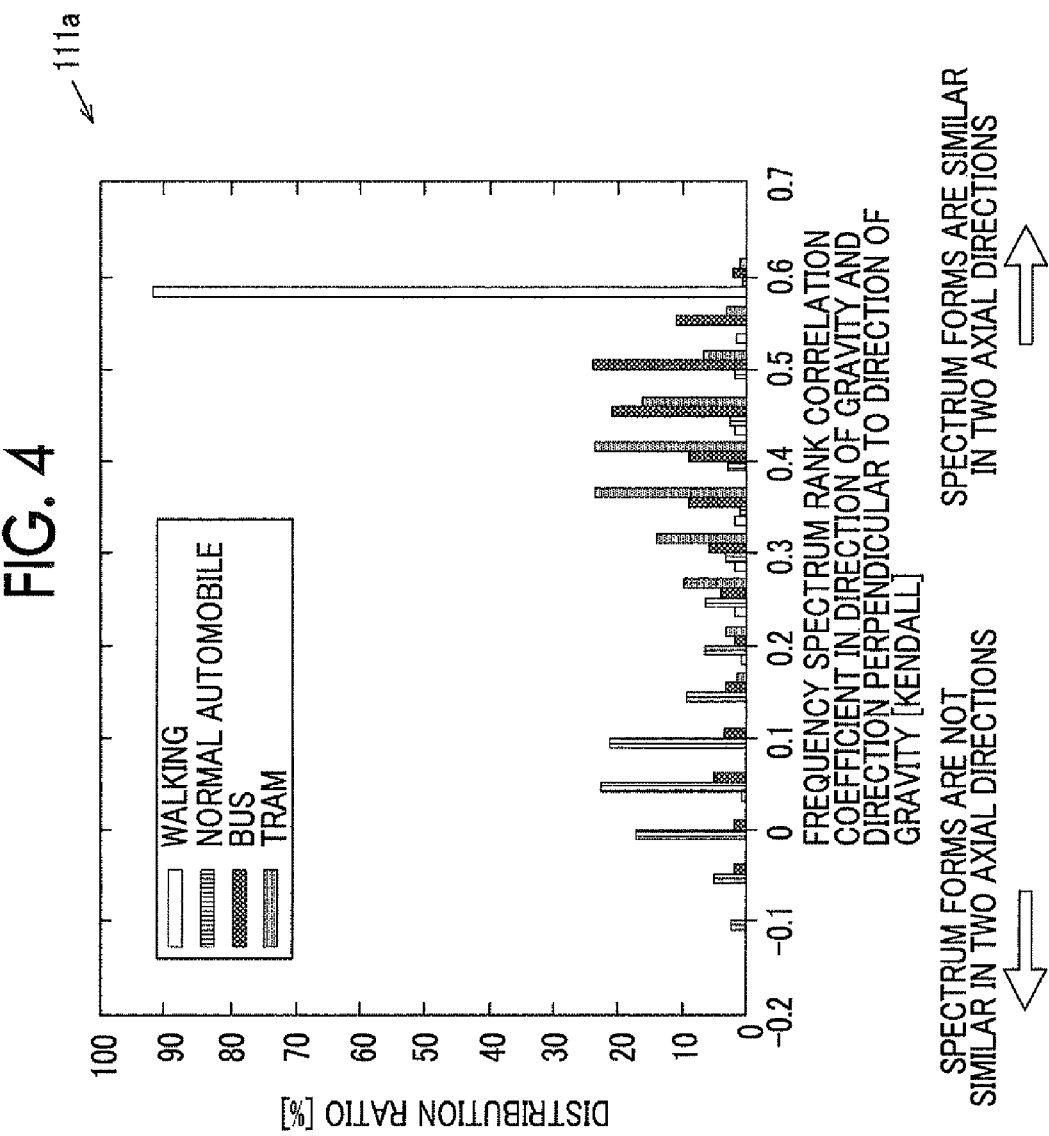

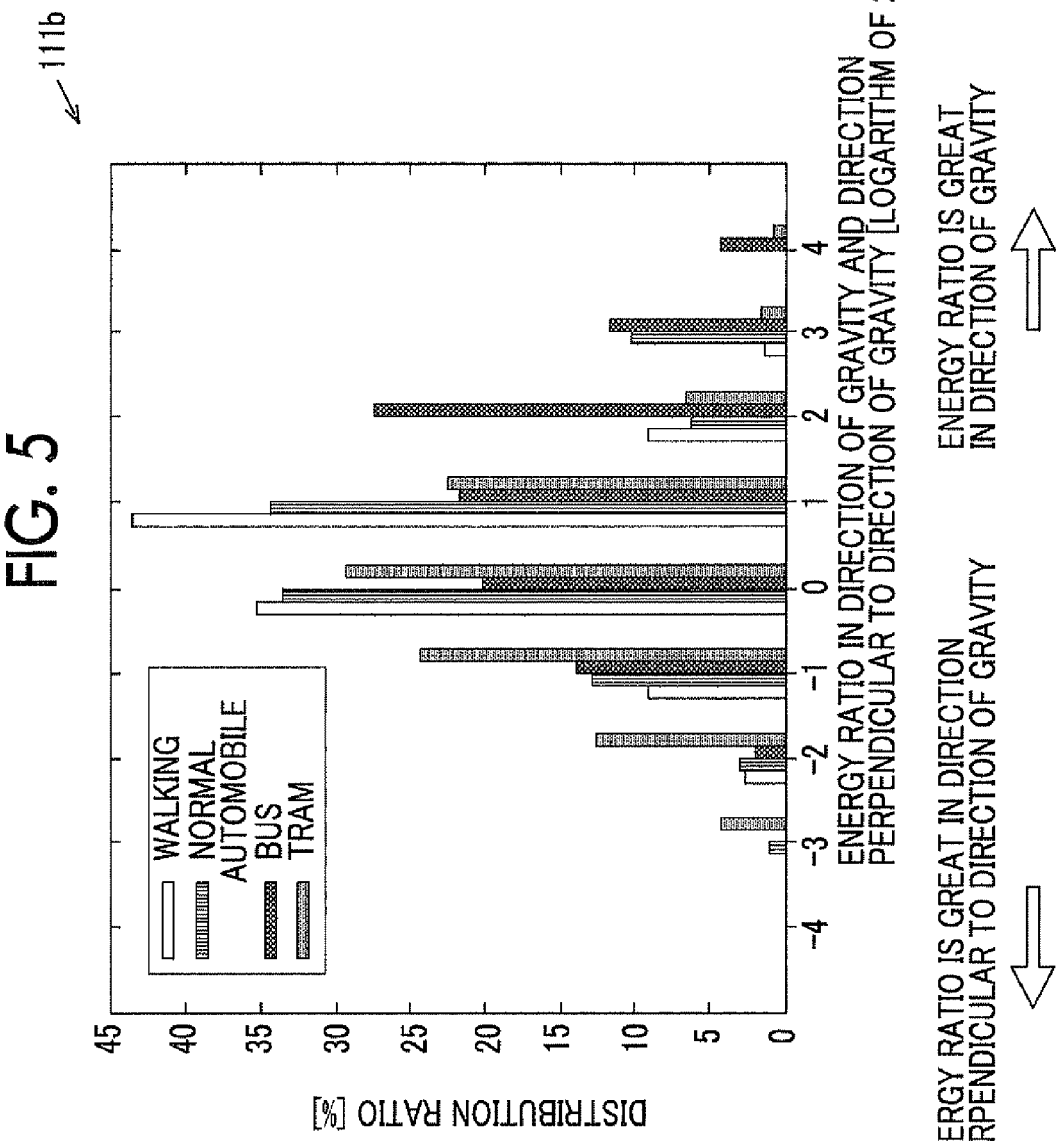

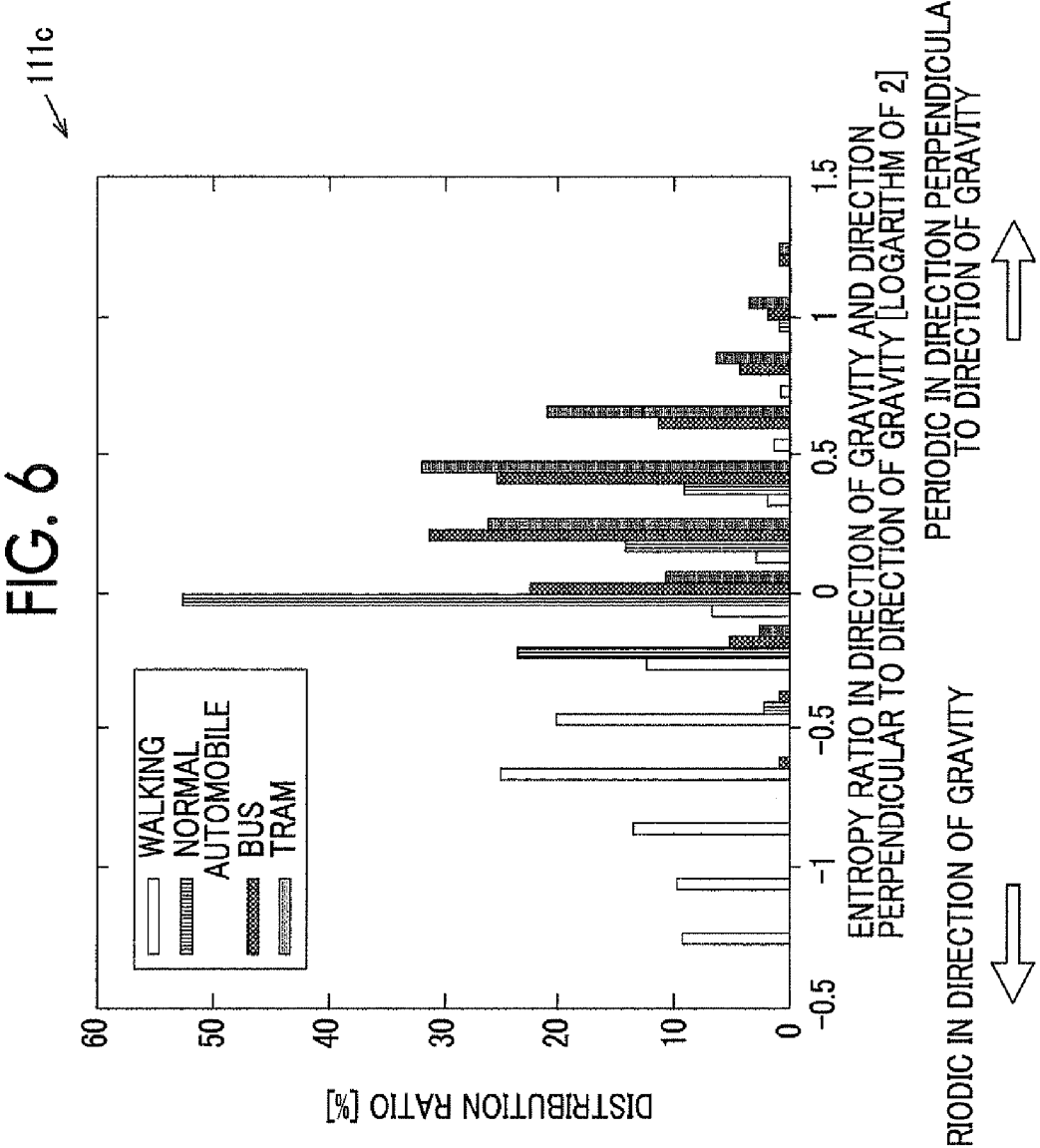

NON-TRANSITORY COMPUTER READABLE MEDIUM STORING PROGRAM, MOVEMENT SITUATION DETERMINING METHOD, AND MOVEMENT SITUATION DETERMINING DEVICE

CROSS-REFERENCE TO RELATED APPLICATIONS

This application is based on and claims priority under 35 USC 119 from Japanese Patent Application No. 2012-065775 filed Mar. 22, 2012.

BACKGROUND (i) Technical Field

The present invention relates to a non-transitory computer readable medium storing a program, a movement situation determining device, and a movement situation determining method.

(ii) Related Art

In the related art, a movement situation determining device which converts a detection result of a vibration sensor into frequency spectrum data and determines a movement situation is known.

SUMMARY

According to an aspect of the present invention, there is provided a non-transitory computer readable medium storing a movement situation determining program for causing a computer to function as:

a two-axial direction correlation value calculating portion that calculates a correlation value indicating a relationship between motions in two axial directions of a plurality of axial directions on the basis of information obtained by detecting motions of a moving target in the plurality of axial directions; and a movement situation determining portion that determines a movement situation of the moving target on the basis of the correlation value.

BRIEF DESCRIPTION OF THE DRAWINGS

Exemplary embodiments of the present invention will be described in detail based on the following figures, wherein:

FIG. 1 is a schematic block diagram illustrating a configuration example of the movement situation determining device according to an exemplary embodiment of the present invention;

FIG. 2 is a flowchart illustrating an operation example of the movement situation determining device;

FIG. 4 is a graph diagram illustrating an example of the configuration of the determination condition information;

FIG. 5 is a graph diagram illustrating an example of the configuration of the determination condition information;

FIG. 6 is a graph diagram illustrating an example of the configuration of the determination condition information.

DETAILED DESCRIPTION

Configuration of Movement Situation Determining Device

Figure 3A:
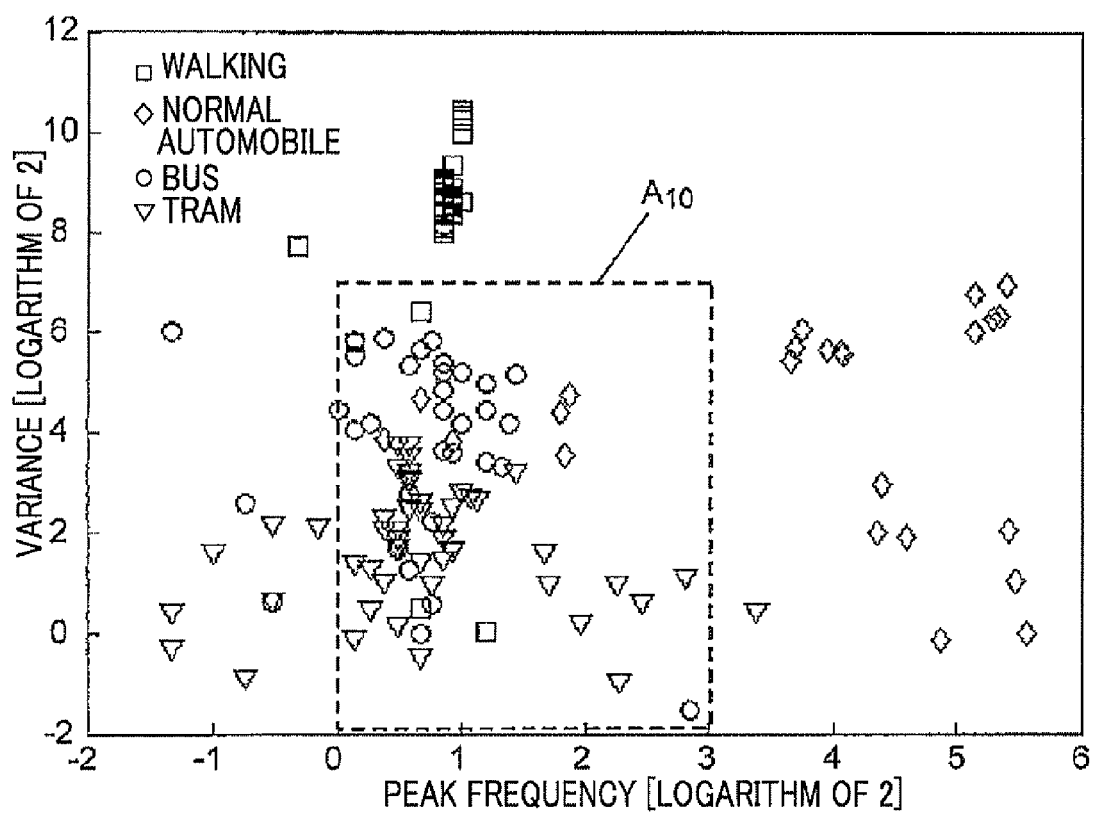
FIG. 3A is a graph diagram illustrating a distribution of feature amounts of the moving objects.

FIG. 1 is a schematic block diagram illustrating a configuration example of the movement situation determining device according to an exemplary embodiment of the present invention.

The movement situation determining device 1 detects accelerations in plural axial directions which are an example of the amount indicating a motion of a moving object (not shown) using an acceleration sensor, and determines a movement situation of the moving object on the basis of a feature amount calculated from an acceleration in each of the plural axial directions and a correlation value indicating a relationship between the accelerations in the plural axial directions.

In addition, the movement situation determining device 1 includes a controller 10 which is constituted by a CPU (Central Processing Unit) or the like, controls the respective parts, and executes a variety of programs, a memory 11 which is constituted by a storage medium such as an HDD (Hard Disk Drive) or a flash memory and stores information, an acceleration sensor 12 which detects accelerations in plural axial directions of a moving object, and a communication unit 13 which communicates with external devices.

Further, the acceleration sensor 12 may be separately provided on outside of the movement situation determining device 1. In addition, in addition to the acceleration sensor detecting accelerations, amounts regarding other motions of a moving object may be detected using a gyro sensor, a magnetic field sensor, a vibration sensor, and the like.

The movement situation determining device 1 is, for example, a computer, and may be a PDA (Personal Digital Assistant), a mobile phone, or the like. In addition, a display or an input unit may be further provided.

The controller 10 functions as a sensor information acquiring portion 100, a gravity direction determining portion 101, an axial direction feature amount calculating portion 102, a two-axial direction correlation value calculating portion 103, a movement situation determining portion 104, determination result notifying portion 105, and the like by executing a movement situation determining program 110 described later.

The sensor information acquiring portion 100 acquires accelerations of a moving object detected by the acceleration sensor 12 as acceleration information in each axial direction detected by the acceleration sensor 12.

In addition, the sensor information acquiring portion 100 may not only acquire the acceleration information from the acceleration sensor 12 in real time but also acquire time-series information of accelerations detected in the past.

The gravity direction determining portion 101 determines the direction of gravity from the acceleration information acquired by the sensor information acquiring portion 100. In addition, the gravity direction determining portion 101 calculates averages of accelerations in the respective axial directions detected by the acceleration sensor 12 during a specific time period in the past and determines that a direction where an absolute value thereof is the maximum is the direction of gravity as an example of the determination method.

The axial direction feature amount calculating portion 102 calculates feature amounts in each axial direction detected by the acceleration sensor 12 from the acceleration information acquired by the sensor information acquiring portion 100. The calculated feature amounts are an average, a variance, a peak frequency, a peak value, energy, entropy, and the like.

In addition, the average is calculated by taking a sum of the acceleration information during a specific time period and dividing the sum by the number N of data included in the specific time period. The variance is calculated by calculating a sum of squares of differences between the acceleration information and averages thereof during a specific time period and dividing the sum by the number N of data. The peak frequency is calculated by calculating power spectra of the acceleration information during a specific time period and obtaining a frequency having the greatest power. However, a DC component around 0 Hz is excluded.

Further, the peak value is calculated from a power value at the peak frequency. The energy is calculated from a sum of the power spectra. However, a DC component around 0 Hz is excluded. The entropy is calculated as follows. First, spectrum densities are calculated by dividing the power spectra by the energy, then products of the spectrum densities and logarithms thereof are calculated, and a sign of a sum of values thereof is reversed, thereby calculating the entropy.

The two-axial direction correlation value calculating portion 103 calculates correlation values indicating a relationship between accelerations in two axial directions of the acceleration sensor 12 from the acceleration information acquired by the sensor information acquiring portion 100. The calculated correlation values are a spectrum correlation coefficient, a root-mean-square of a spectrum difference, an energy ratio, an entropy ratio, a variance ratio, and the like.

The spectrum correlation coefficient is calculated from a correlation coefficient between power spectra in two axial directions. As the correlation coefficient, a Pearson's product-moment correlation coefficient, a Spearman's rank correlation coefficient, a Kendall's rank correlation coefficient, or the like may be used.

The root-mean-square of a spectrum difference is calculated by obtaining a difference between frequency components of power spectra in two axial directions and taking a root-mean-square thereof. The energy ratio is calculated by taking a ratio of energy in two axial directions. The entropy ratio is calculated from a ratio of entropy in two axial directions. The variance ratio is calculated from a ratio of variances in two directions.

The movement situation determining portion 104 determines a movement situation of a moving target on the basis of the feature amounts calculated by the axial direction feature amount calculating portion 102, the correlation values calculated by the two-axial direction correlation value calculating portion 103, and determination condition information 111.

The determination result notifying portion 105 notifies an external user of the determination result of the movement situation determining portion 104 via the communication unit 13 or the like, or notifies a user using images, characters, or the like when connected to a display.

The memory 11 stores the movement situation determining program 110 which operates the controller 10 as the above-described portions 100 to 105, the determination condition information 111 where the movement situations, the feature amounts, and the correlation values are registered in correlation with each other, and the like.

Operation of Movement Situation Determining Device

Hereinafter, an operation of the movement situation determining device 1 will be described with reference to FIGS. 1 to 7.

FIG. 2 is a flowchart illustrating an operation example of the movement situation determining device 1.

First, the sensor information acquiring portion 100 acquires accelerations of a moving object detected by the acceleration sensor 12 as acceleration information in each axial direction detected by the acceleration sensor 12 (S1).

Next, the gravity direction determining portion 101 calculates averages of accelerations in the respective axial directions detected by the acceleration sensor 12 during a specific time period in the past and determines that a direction where an absolute value thereof is the maximum is the direction of gravity on the basis of the acceleration information acquired by the sensor information acquiring portion 100 (S2).

Figure 3B:
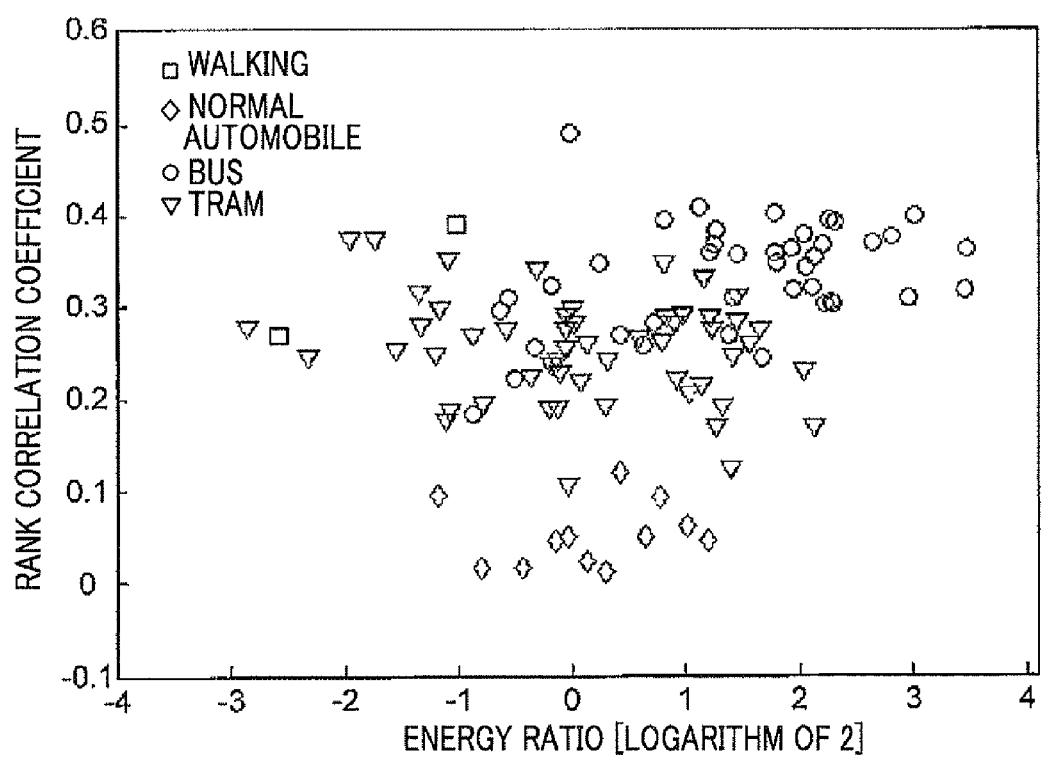
FIG. 3B is a graph diagram illustrating an example of the distribution of correlation values between two axial directions of moving objects.

FIG. 3A is a graph diagram illustrating an example of the distribution of feature amounts of moving objects, and FIG. 3B is a graph diagram illustrating an example of the distribution of correlation values of moving objects in the two axial directions.

Next, the axial direction feature amount calculating portion 102, as shown in FIG. 3A, calculates peak frequencies of power spectra and variances of accelerations as the feature amounts for the direction of gravity of the acceleration sensor 12 and the direction perpendicular to the direction of gravity, from the acceleration information acquired by the sensor information acquiring portion 100 (S3).

In addition, the two-axial direction correlation value calculating portion 103, as shown in FIG. 3B, calculates energy ratios and the Spearman's rank correlation coefficients as correlation values indicating relationships between accelerations in the two axial directions of the acceleration sensor 12 from the acceleration information acquired by the sensor information acquiring portion 100 (S4). In addition, the data shown in FIG. 3B is calculated by the two-axial direction correlation value calculating portion 103 on the basis of information corresponding to the data in the area $A_{10}$ ($0 < x < 3$, $0 < y < 7$) of FIG. 3A.

The movement situation determining portion 104 determines a movement situation of a moving target on the basis of the feature amounts calculated by the axial direction feature amount calculating portion 102, the correlation coefficients calculated by the two-axial direction correlation value calculating portion 103, and the determination condition information 111 (S5). In addition, the movement situation determining portion 104 may use methods such as a neural network, a support vector machine, or a decision tree as a method for calculating similarities between the feature amounts, the correlation values, and the determination condition information 111.

First, as shown in FIG. 3A, to an extent, the movement situation determining portion 104 determines that a movement situation is "walking" if the peak frequency is great and that a movement situation is a "normal automobile" if the variance is great, but it is difficult for the data in the area $A_{10}$ to be determined since plural movement situations are mixed.

Therefore, the movement situation determining portion 104 determines movement situations of the data in the area $A_{10}$ using the correlation values as shown in FIG. 3B. Hereinafter, a relationship with the determination condition information 111 will be described in detail.

FIGS. 4 to 6 are graph diagrams illustrating an example of the configuration of the determination condition information 111.

As shown in FIG. 4, the determination condition information 111a shows a distribution of rank correlation coefficients as an example of the similarity of frequency spectrum forms created by the two-axial direction correlation value calculating portion 103 on the basis of the acceleration information detected in advance. Here, the distribution of rank correlation coefficients shows that the greater the value of the rank correlation coefficient, the more similar the frequency spectrum forms in the two axial directions (the direction of gravity and the direction perpendicular to the direction of gravity), and the smaller, the less similar.

From the determination condition information 111a shown in FIG. 4, the movement situation determining portion 104 determines that a movement situation is "walking" if the rank correlation coefficient is great, determines that a movement situation is a "normal automobile" if the rank correlation coefficient is small, and determines that a movement situation is a "bus" or a "tram" if the rank correlation coefficient is approximately medium.

In addition, as shown in FIG. 5, the determination condition information 111b shows a distribution of energy ratios as an example of the ratio of vibration intensities in the direction of gravity and the direction perpendicular to the direction of gravity created by the two-axial direction correlation value calculating portion 103 on the basis of the acceleration information detected in advance. Here, the distribution of energy ratios shows that the greater the energy ratio, the greater the energy in the direction of gravity, and the smaller, the greater the energy in the direction perpendicular to the direction of gravity.

From the determination condition information 111b shown in FIG. 5, the movement situation determining portion 104 determines that a movement situation is a "bus" if the energy ratio is great.

In addition, as shown in FIG. 6, the determination condition information 111c shows a distribution of entropy ratios as an example of the ratio of periodicities of vibration created by the two-axial direction correlation value calculating portion 103 on the basis of the acceleration information detected in advance. Here, the distribution of entropy ratios shows that the greater the entropy ratio, the more periodic the direction perpendicular to the direction of gravity, and the smaller, the more periodic the direction of gravity.

From the determination condition information 111c shown in FIG. 6, the movement situation determining portion 104 determines that a movement situation is a "bus" or a "tram" if the entropy ratio is great, determines that a movement situation is "walking" if the entropy ratio is small, and determines that a movement situation is an "automobile" if the entropy ratio is 1 (the entropy in the direction of gravity is the same as the entropy in the direction perpendicular to the direction of gravity).

The movement situation determining portion 104 may improve accuracy of determination of a movement situation by the use of the above-described determination condition information 111a to 111c or plural pieces of determination condition information using other correlation values. Hereinafter, a case of using plural pieces of determination condition information will be described.

Figure 7:
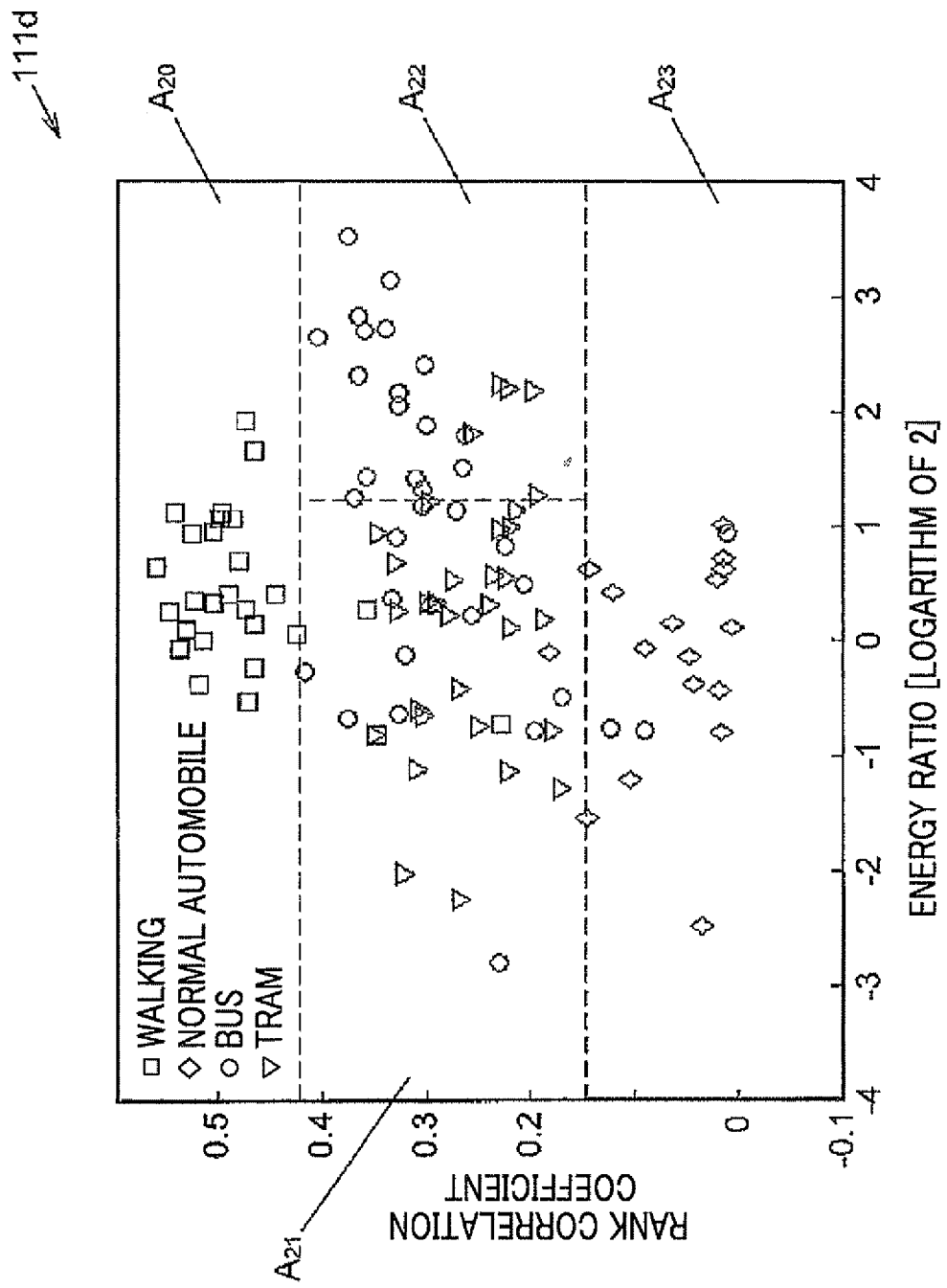
FIG. 7 is a graph diagram illustrating an example of the configuration of the determination condition information.

FIG. 7 is a graph diagram illustrating an example of the configuration of the determination condition information 111.

As shown in FIG. 7, the determination condition information 111d is obtained by combining the determination condition information 111a and 111b, and is divided into areas $A_{20}$ to $A_{23}$ on the graph diagram which has the energy ratio and the rank correlation coefficient as axes.

The movement situation determining portion 104 determines that, if the rank correlation coefficient is great, that is, data belongs to the area $A_{20}$, a movement situation of the data is "walking".

In addition, the movement situation determining portion 104 determines that, if the rank correlation coefficient is approximately medium and the energy ratio is small, that is, data belongs to the area $A_{21}$, a movement situation of the data is a "tram".

Further, the movement situation determining portion 104 determines that, if the rank correlation coefficient is approximately medium and the energy ratio is great, that is, data belongs to the area $A_{22}$, a movement situation of the data is a "bus".

In addition, the movement situation determining portion 104 determines that, if the rank correlation coefficient is small, that is, data belongs to the area $A_{23}$, a movement situation of the data is a "normal automobile".

Next, the determination result notifying portion 105 notifies an external user of the determination result of the movement situation determining portion 104 via the communication unit 13 or the like, or notifies a user using images, characters or the like when connected to a display (S6).

Effects of Exemplary Embodiment

According to the above exemplary embodiment, a correlation value indicating a relationship between two axial directions is calculated from information obtained by detecting a motion of a moving object, and a movement situation is determined based on the correlation value. Therefore, it is possible to improve accuracy of determination as compared with a case where a feature amount is calculated from information obtained by detecting a motion of a moving object in one axial direction and a movement situation is determined.

Other Exemplary Embodiments

The present invention is not limited to the above exemplary embodiment and may be variously modified within the scope without departing from the spirit of the present invention.

In addition, the movement situation determining program 110 may be stored on a storage medium such as a CD-ROM and be provided, or may be downloaded to a memory in the device from a server device connected to a network such as the Internet. In addition, some or all of the sensor information acquiring portion 100, the gravity direction determining portion 101, the axial direction feature amount calculating portion 102, the two-axial direction correlation value calculating portion 103, the movement situation determining portion 104, the determination result notifying portion 105, and the like may be implemented by hardware such as an ASIC. Further, the respective steps shown in the operation description of the above exemplary embodiment may be altered in order thereof, be omitted, or be added.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a movement situation determining program for causing:
    an acceleration sensor of a mobile computing device to acquire accelerations of a moving target by detecting accelerations of the mobile computing device in two axial directions of a plurality of axial directions on the basis of information obtained by detecting motions of a moving target in the plurality of axial direction, the mobile computing device traveling along with the moving target;
    a two-axial direction correlation value calculating portion, executed by a processor of the mobile computing device, to calculate a correlation value comprising at least one of energy ratios and the Spearman's rank correlation coefficients, wherein the correlation value indicates accelerations of the acceleration sensor on the basis of information obtained by detecting motions of the moving target in the plurality of axial directions;
    a movement situation determining portion, executed by the processor, to determine a movement situation of the moving target on the basis of the correlation value;
    a determination result notifying portion, executed by the processor, to notify, via a network, an external computing device that is separate from the mobile computing device of the determination result of the movement situation determining portion via a communication unit,
    wherein, when the external computing device receives the notification, the external computing device causes an application to open and displays the determination result using images or characters when connected to a display.

2. The computer readable medium according to claim 1, further causing:
    an axial direction feature amount calculating portion to calculate a feature amount in each axial direction of the plurality of axial directions,
    wherein the movement situation determining portion determines the movement situation of the moving target on the basis of the feature amount and the correlation value.

3. The computer readable medium according to claim 1, wherein the two-axial direction correlation value calculating portion sets one of the two axial directions as a direction of gravity.

4. The computer readable medium according to claim 2, wherein the two-axial direction correlation value calculating portion sets one of the two axial directions as a direction of gravity.

5. The computer readable medium according to claim 1, wherein the two-axial direction correlation value calculating portion calculates a similarity of frequency spectrum forms as the correlation value.

6. The computer readable medium according to claim 2, wherein the two-axial direction correlation value calculating portion calculates a similarity of frequency spectrum forms as the correlation value.

7. The computer readable medium according to claim 3, wherein the two-axial direction correlation value calculating portion calculates a similarity of frequency spectrum forms as the correlation value.

8. The computer readable medium according to claim 4, wherein the two-axial direction correlation value calculating portion calculates a similarity of frequency spectrum forms as the correlation value.

9. The computer readable medium according to claim 1, wherein the two-axial direction correlation value calculating portion calculates a ratio of vibration intensities as the correlation value.

10. The computer readable medium according to claim 2, wherein the two-axial direction correlation value calculating portion calculates a ratio of vibration intensities as the correlation value.

11. The computer readable medium according to claim 3, wherein the two-axial direction correlation value calculating portion calculates a ratio of vibration intensities as the correlation value.

12. The computer readable medium according to claim 4, wherein the two-axial direction correlation value calculating portion calculates a ratio of vibration intensities as the correlation value.

13. The computer readable medium according to claim 1, wherein the two-axial direction correlation value calculating portion calculates a ratio of vibration periodicities as the correlation value.

14. The computer readable medium according to claim 2, wherein the two-axial direction correlation value calculating portion calculates a ratio of vibration periodicities as the correlation value.

15. The computer readable medium according to claim 3, wherein the two-axial direction correlation value calculating portion calculates a ratio of vibration periodicities as the correlation value.

16. The computer readable medium according to claim 4, wherein the two-axial direction correlation value calculating portion calculates a ratio of vibration periodicities as the correlation value.

17. A movement situation determining method comprising:
    receiving, at a movement situation determining device over a network, acceleration data from an acceleration sensor of a first mobile computing device, wherein the acceleration data is obtained by the acceleration sensor detecting accelerations of the first mobile computing device in two axial directions of a plurality of axial directions on the basis of information obtained by detecting motions of a moving target in the plurality of axial direction;
    calculating, by a processor of the movement situation determining device, a correlation value comprising at least one of energy ratios and the Spearman's rank correlation coefficients, wherein the correlation value indicates a relationship between accelerations in two axial directions of a plurality of axial directions of an acceleration sensor on the basis of information obtained by detecting motions of the moving target in the plurality of axial directions; and
    determining, by the processor of the movement situation determining device, a movement situation of the moving target on the basis of the correlation value; and
    sending a notification, from the movement situation determining device to a second mobile computing device over a network, the determination result via a communication unit of the movement situation determining device, wherein the second mobile computing device, the first mobile computing device and the movement situation determining device are all separate devices, wherein, when the second mobile computing device receives the notification, the second mobile computing device causes an application to open and displays the determination result using images or characters when connected to a display.

18. The movement situation determining method according to claim 17, further comprising:
calculating a feature amount in each axial direction of the plurality of axial directions,
wherein the movement situation of the moving target is determined on the basis of the feature amount and the correlation value.

19. The movement situation determining method according to claim 18, wherein at least one of a similarity of frequency spectrum forms, a ratio of vibration intensities and a ratio of vibration periodicities is calculated as the correlation value.

20. A non-transitory computer readable medium storing a movement situation determining program for causing:
a transceiver to receive, at a movement situation determining device over a network, acceleration data from an acceleration sensor of a first mobile computing device, wherein the acceleration data is obtained by the acceleration sensor detecting accelerations of the first mobile computing device in two axial directions of a plurality of axial directions on the basis of information obtained by detecting motions of a moving target in the plurality of axial direction;
a two-axial direction correlation value calculating portion, executed by the processor, to calculate a correlation value comprising at least one of energy ratios and the Spearman's rank correlation coefficients, wherein the correlation value indicates a relationship between the accelerations of the acceleration sensor;
a movement situation determining portion, executed by the processor, to determine a movement situation of the moving target on the basis of the correlation value;
a determination result notifying portion, executed by the processor, to notify, from the movement situation determining device over a network, a second mobile computing device of the determination result of the movement situation determining portion via a communication unit, wherein the second mobile computing device, the first mobile computing device and the movement situation determining device are all separate devices,
wherein, when the second mobile computing device receives the notification, the second mobile computing device causes an application to open and displays the determination result using images or characters when connected to a display.

21. A non-transitory computer readable medium storing a movement situation determining program for executing a method, the method comprising:
receiving, over a network, acceleration data from an acceleration sensor of a first mobile computing device that is external to a movement situation computing device, wherein the acceleration data is obtained by the acceleration sensor detecting accelerations of the first mobile computing device in two axial directions of a plurality of axial directions on the basis of information obtained by detecting motions of a moving target in the plurality of axial direction, while the first mobile computing device is on the moving target;
calculating, by a processor of the movement situation computing device, a correlation value indicating a relationship between the accelerations of the acceleration sensor;
determining, by a processor of the movement situation computing device, the type of transportation the moving target is performing on the basis of the correlation value, the type of transportation being at least one of an automobile, a bus and a tram; and
outputting, by a processor of the movement situation computing device, a notification to the movement situation computing device via a communication unit,
wherein the notification causes an application of the movement situation computing device to open and displays the determination result using images or characters to a display.

* * * * *